US011134112B2

(12) United States Patent
Sinha et al.

(10) Patent No.: US 11,134,112 B2
(45) Date of Patent: Sep. 28, 2021

(54) SECURE MULTI-PARTY RANDOM BIT GENERATION

(71) Applicant: Visa International Service Association, San Francisco, CA (US)

(72) Inventors: Rohit Sinha, San Jose, CA (US); Ranjit Kumaresan, San Francisco, CA (US); Sivanarayana Gaddam, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 126 days.

(21) Appl. No.: 16/691,468

(22) Filed: Nov. 21, 2019

(65) Prior Publication Data

US 2021/0160293 A1     May 27, 2021

(51) Int. Cl.
*H04L 9/32*        (2006.01)
*H04L 29/06*     (2006.01)
*H04L 9/00*        (2006.01)

(52) U.S. Cl.
CPC .......... *H04L 65/4076* (2013.01); *H04L 9/006* (2013.01); *H04L 9/3234* (2013.01); *H04L 9/3247* (2013.01)

(58) Field of Classification Search
CPC ....... H04L 9/08; H04L 9/0861; H04L 9/0869; H04L 9/0877; H04L 9/30
See application file for complete search history.

(56) References Cited

U.S. PATENT DOCUMENTS

| | | | |
|---|---|---|---|
| 9,614,670 B1* | 4/2017 | Ghetti | G06F 21/602 |
| 2013/0013921 A1* | 1/2013 | Bhathena | H04L 63/0471 |
| | | | 713/168 |

(Continued)

OTHER PUBLICATIONS

R. Cleve, Limits on the security of coin flips when half the processors are faulty, In Proceedings of the Eighteenth Annual ACM Symposium on Theory of Computing, ser. STOC '86, New York, NY, USA: ACM, 1986, pp. 364-369.

(Continued)

*Primary Examiner* — Ario Etienne
*Assistant Examiner* — Kidest Mendaye
(74) *Attorney, Agent, or Firm* — Kilpatrick Townsend & Stockton LLP

(57) ABSTRACT

Methods and systems for secure multi-party generation of random bits are disclosed. These random bits can be generated securely, even if some parties (i.e., less than a corruption threshold) are dishonest or malicious. Methods and systems can use secure environments in order to securely generate and store cryptographic keys. Using broadcast protocols such as Dolev-Strong, a generator computer can distribute a public protocol instance key to other participant computers. Each participant computer can generate a random bit and encrypted the random bit with the public protocol instance key, and broadcast its encrypted random bit to the other participant computers. Once each participant computer has received the encrypted random bits from all other participant computers, the private protocol instance key can be released to the participant computers, enabling the participant computers to decrypt the encrypted random bits, and calculate an output random bit based on the encrypted random bits.

19 Claims, 12 Drawing Sheets

(56) References Cited

U.S. PATENT DOCUMENTS

| | | | | |
|---|---|---|---|---|
| 2017/0223015 | A1* | 8/2017 | Lee | H04L 63/0853 |
| 2018/0012032 | A1* | 1/2018 | Radich | H04L 9/30 |
| 2018/0159833 | A1* | 6/2018 | Zhang | H04L 29/06 |
| 2018/0167203 | A1* | 6/2018 | Belenko | H04L 9/14 |
| 2018/0309567 | A1* | 10/2018 | Wooden | G06F 21/6209 |
| 2018/0330079 | A1* | 11/2018 | Gray | H04L 9/3247 |
| 2019/0005470 | A1* | 1/2019 | Uhr | G06Q 20/02 |
| 2019/0190954 | A1* | 6/2019 | Fu | H04L 9/30 |
| 2019/0349190 | A1* | 11/2019 | Smith | H04L 61/2069 |
| 2020/0145231 | A1* | 5/2020 | Trevethan | H04L 9/3239 |
| 2020/0342092 | A1* | 10/2020 | Wei | H04L 9/3247 |

OTHER PUBLICATIONS

R. Pass et al., "Formal abstractions for attested execution secure processors," in Annual International Conference on the Theory and Applications of Cryptographic Techniques. Springer, 2017, pp. 260-289.

B. Fisch et al., " Iron: Functional encryption using intel sgx," in Proceedings of the 2017 ACM SIGSAC Conference on Computer and Communications Security, ser. CCS '17. New York, NY USA: ACM, 2017, pp. 765-782.

P. Subramanyan et al., "A formal foundation for secure remote execution of enclaves," in Proceeding of the 2017 ACM SIGSAC Conference on Computer and Communications Security, ser. CCS '17. New York, NY, USA: ACM 2017, pp. 2435-2450.

* cited by examiner

| | | Host Protocol $Prot_{fct}[p_1, ..., p_n]$ |
|---|---|---|
| 402 | (1) | Launch the $\varepsilon_{fct}$ enclave and generate key material |
| 404 | | if i > t then skip |
| 406 | | let e ← HW.Load($prog_{fct}$) |
| 408 | | let msg ← HW.Run(e, ("genKey")) |
| 410 | | let $[q_1, ..., q_t]$ ← $Prot_{DS}[p_1, ..., p_t]$ with input msg |
| 412 | | let generator ← 1 |
| 414 | (2) | Establish Protocol Instance Key |
| 416 | | if generator = i { |
| 418 | |     let msg ← HW.Run(e, ("genProtKey", $q_1, ..., q_t$)) |
| 420 | |     invoke $Prot_{DS}[p_1, ..., p_n]$ with input msg |
| 422 | | } else if generator ≤ t { |
| 424 | |     let msg ← $Prot_{DS}[p_1, ..., p_n]$ |
| 426 | |     if msg = ⊥ then increment generator and retry step (2) |
| 428 | |     HW.run(e, ("loadKey", msg)) |
| 430 | | } else { |
| 432 | |     invoke $Prot_{HFCT}[p_{t+1}, ..., p_n]$ |
| 434 | | } |
| 436 | (3) | Broadcast individual coins |
| 438 | | let msg ← PKE.Enc(pk, S.Sig($sk_{pi}$, $b_i$)) |
| 440 | | let $[e_{b1}, ..., e_{bn}]$ ← $Prot_{DS}[p_1, ..., p_n]$ with input msg |
| 442 | (4) | Sharing Secret Key |
| 444 | | if i ≤ t { |
| 446 | |     let msg ← HW.Run(e, ("revealKey1")) |
| 448 | |     let $[e'_{bt+1}, ..., e'_{bn}]$ ← $Prot_{DS}[p_1, ..., p_n]$ with input msg |
| 450 | | } else { |
| 452 | |     receive $[e'_{bt+1}, ..., e'_{bn}]$ as output of $Prot_{DS}$ |
| 454 | |     let sk ← PKE.Dec($pk_{pi}$, $e'_{bi}$) |
| 456 | |     let $[b_1, ..., b_n]$ ← [PKE.Dec(sk, $e_{b1}$), ..., PKE.dec(sk, $e_{bn}$)] |
| 458 | |     output $b_1 \oplus ... \oplus b_n$ |
| 460 | | } |
| 462 | (5) | Obtain Local Output |
| 464 | | if i > t then skip |
| 466 | | let sk ← HW.Run(e, ("revealKey2")) |
| 468 | | let $[b_1, ..., b_n]$ ← [PKE.Dec(sk, $e_{b1}$), ..., PKE.Dec(sk, $e_{bn}$)] |
| 470 | | output $b_1 \oplus ... \oplus b_n$ |

FIG. 4

| | Enclave Program prog$_{fct}$ |
|---|---|
| 502 | • On input ("genKey") |
| 504 |     let (epk,esk) ← PKE.Keygen($1^\lambda$) |
| 506 |     return HW.Quote(epk) |
| 508 | • On input ("loadKey", in) |
| 510 |     let (μ, pk \|\| $ct_1$, ..., $ct_t$) ← in |
| 512 |     assert μ = μ($\mathcal{E}_{fct}$) ∧ HW.QuoteVerify(in) |
| 514 |     let sk ← PKE.Dec(esk, $ct_i$) |
| 516 | • On input ("genProtKey", in) |
| 518 |     Let $q_1$, ..., $q_t$ ← in |
| 520 |     Let ($μ_1$, $epk_1$) ← $q_1$, ..., ($μ_t$, $epk_t$) ← $q_t$ |
| 522 |     assert ($μ_1$) = μ($\mathcal{E}_{fct}$) ∧ ... ∧ $μ_t$ = μ($\mathcal{E}_{fct}$) |
| 524 |     assert HW.QuoteVerify($q_1$) ∧ ... ∧ HW.QuoteVerify($q_t$) |
| 526 |     Let (pk, sk) ← PKE.Keygen($1^\lambda$) |
| 528 |     Let out ← pk \|\| PKE.Enc($epk_1$, sk), ..., PKE.Enc($epk_t$, sk) |
| 530 |     return HW.Quote(out) |
| 532 | • On input ("revealKey1") |
| 534 |     assert round == 3 * t + 4 |
| 536 |     return HW.Quote(PKE.Enc($pk_{t+1}$, sk), ..., PKE.Enc($pk_n$, sk)) |
| 538 | • On input ("revealKey2") |
| 540 |     assert round == 4 * t + 6 |
| 542 |     return sk |

FIG. 5

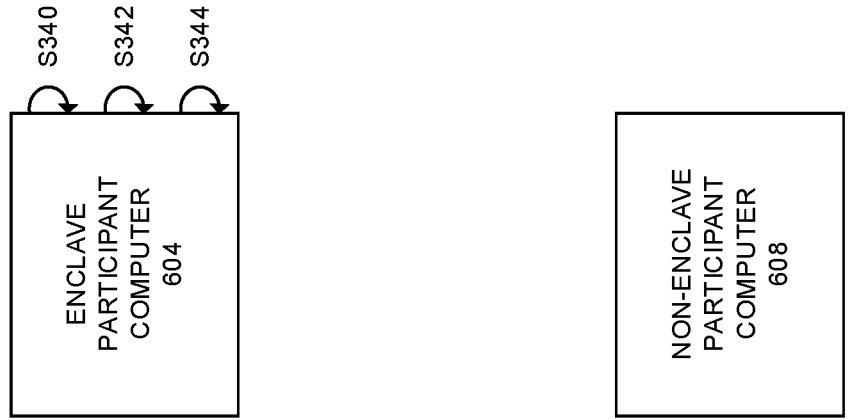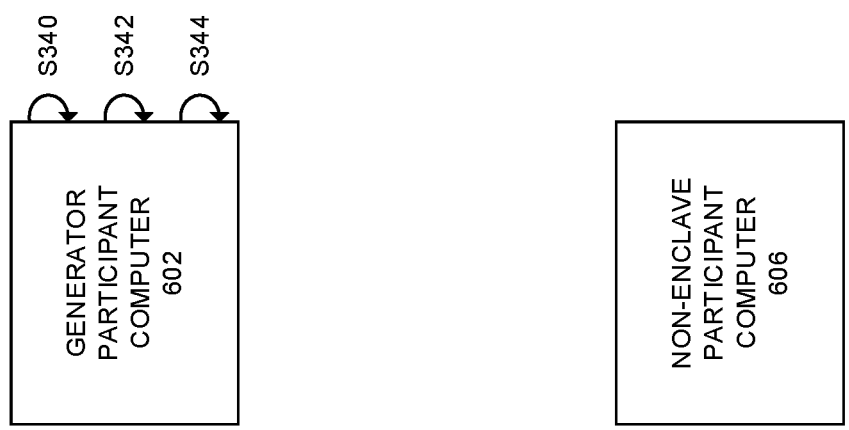
FIG. 6E

SECURE MULTI-PARTY RANDOM BIT GENERATION

BACKGROUND

Computers are often used to generate random or pseudorandom numbers. These random numbers may be used in subsequent processes or operations. For example, a random number may be used as a random nonce or used to generate cryptographic keys or other cryptographic material. Other uses of random numbers include seed values for other processes (such as procedurally generated CGI scenes), randomness in videogames, lottery numbers, etc.

In some applications, multiple parties may want assurance that computer generated random or pseudorandom numbers are actually random, as opposed to just appearing random. For example, a lottery system with non-random winning lottery numbers is much easier to cheat than a lottery system with actual random winning numbers. Honest lottery companies, oversight committees, and players generally want systems that they know are fair, and randomness is one way to ensure that fairness.

One solution to this problem is multi-party generation of random numbers. Rather than a single computer or party generating a random number that affects multiple parties, the interested parties can all participate in the random number generation process. However, even with each interested party participating, one or more dishonest parties may still be able to manipulate the output random number. For example, a malicious employee of a lottery company may be able to fix winning lottery numbers in order to commit lottery fraud, even with the participation of honest parties, such as a state-run oversight committee.

Embodiments address these and other problems, individually and collectively.

SUMMARY

Embodiments are directed to methods and systems for secure, multi-party random number generation. A number of participant computers can collectively execute a protocol. The end result of this protocol is an output random bit. In one embodiment, the output random bit is uniformly random, i.e., the random bit takes on a value of "1" (TRUE) or "0" (FALSE) with equal probability. However, some embodiments may allow for the generation of random bits that are not uniformly random.

Notably, the protocol can be performed repeatedly by the participant computers in order to generate a sequence of random bits, such as "1101 . . . " This sequence may be interpreted as a number (e.g., "1101" in binary is equivalent to "13" in decimal), as an alphanumeric character sequence (e.g., "a2pty3$"), or as any other randomized data (e.g., a randomized image file). Thus embodiments can be used to generate random data of arbitrary size or length.

Generally summarized, during the protocol, each participant computer independently generates a random bit and encrypts the random bit using a public protocol instance key known to all participant computers. The corresponding private protocol instance key (which can be used to decrypt the encrypted random bits) is stored within one or more secure environments (e.g., trusted execution environments, trusted platform module, hardware security module, etc.). After generating and encrypting the random bits, each participant computer broadcasts their encrypted random bits to each other participant computer. Once each participant computer has the full set of encrypted random bits, the private protocol instance key is released from the one or more secure environments and distributed to the participant computers. The participant computers can then use the private protocol instance key to decrypt the encrypted random bits. Once the encrypted random bits are decrypted, each participant computer can independently calculate an output random bit using a binary function and the unencrypted random bits. In one embodiment, the binary function is the exclusive-or function (XOR). As stated above, the protocol can be repeated any number of times to produce a sequence of random bits, which may be freely interpreted as random data, such as a random number, random string, etc.

Embodiments provide for several safeguards against dishonest behavior by participant computers. As described above in the background, there are several scenarios in which one or more participant computers may act dishonestly. "Acting dishonestly" may comprise not following the protocol in order to bias the final random bit. In one exemplary scenario, the random bit may be used as part of a lottery number. In this scenario, a dishonest participant computer may want to bias the random bit in order to rig the lottery in their favor. In some cases, a participant computer may act dishonestly by willfully miscommunicating information to other participant computers (e.g., sending different data, such as cryptographic keys or encrypted bits to different participant computers). However, embodiments allow honest participant computers to generate an assuredly random bit that is consistent among all participant computers, even in the presence of one or more malicious or dishonest participant computers.

However, because of several features of the protocol, particularly the use of secure environments and secure broadcasting protocols (such as Dolev-Strong), honest participant computers can successfully generate a random bit, even in the presence of multiple dishonest participant computers. Provided there are at least as many secure environments as malicious participant computers, the protocol can be executed successfully.

Notably, honest participant computers can successfully perform the protocol, even in the case where a majority of the participant computers are dishonest. This is an improvement over the prior art. Conventionally, it is assumed that multi-party protocols, such as random number generation, are impossible when a majority of the participants are dishonest, as the dishonest majority can contest any result produced by the honest minority (see "Limits on the Security of Coin Flips when Half the Processors are Faulty" R. Cleve, Proceedings of the eighteenth annual ACM symposium on Theory of computing, 1986).

One embodiment is directed to a method comprising: generating, by a participant computer in a network of participant computers, within a secure environment, an enclave key pair comprising an enclave public key and an enclave private key, wherein the enclave private key is stored within the secure environment, and wherein one or more enclave participant computers in the network of participant computers generate one or more other enclave key pairs; broadcasting, by the participant computer to one or more enclave participant computers in the network of participant computers, the enclave public key; receiving, by the participant computer, one or more other enclave public keys from the one or more enclave participant computers; generating, by the participant computer, within the secure environment, a protocol instance key pair comprising a public protocol instance key and a private protocol instance key, wherein the private protocol instance key is stored within the secure environment; broadcasting, by the participant computer, the public protocol instance key to one or more other participant computers, wherein the one or more other participant computers generate one or more encrypted random bits, the one or more encrypted random bits comprising random bits encrypted with the public protocol instance key; receiving, by the participant computer, the encrypted random bits from the one or more other participant computers; producing, by the participant computer, one or more unencrypted random bits by decrypting the one or more encrypted random bits using the private protocol instance key; and generating, by the participant computer, an output random bit by evaluating a function of at least the one or more unencrypted random bits.

Another embodiment is directed to a participant computer comprising a processor and a non-transitory computer readable medium coupled to the processor, the non-transitory computer readable medium comprising code, executable by the processor for implementing the above-noted method.

Another embodiment is directed to a method comprising: receiving, by a participant computer, from a generator participant computer, a public protocol instance key; generating, by the participant computer, a random bit; producing an encrypted random bit by encrypting the random bit using the public protocol instance key; broadcasting, by the participant computer, to one or more other participant computers, the encrypted random bit; receiving, by the participant computer, from the one or more other participant computers, one or more other encrypted random bits; receiving, by the participant computer, from one or more enclave participant computers, an encrypted private protocol instance key, wherein the encrypted private protocol instance key is encrypted using a public key corresponding to the participant computer; producing, by the participant computer, a private protocol instance key by decrypting the encrypted private protocol instance key using a private key corresponding to the participant computer; producing, by the participant computer, one or more other random bits by decrypting the one or more other encrypted random bits using the private protocol instance key; and generating, by the participant computer, an output random bit by calculating a function of the random bit and the one or more other random bits.

These and other embodiments are described in further detail below.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure environment" may include an environment where data can be stored securely and functions or operations can be performed or executed securely. A secure environment may be implemented via hardware or software. An example of a secure environment is a trusted execution environment (TEE), a secure area of a processor. Another example of a secure element is a trusted platform module (TPM), a dedicated microcontroller designed to secure hardware through integrated cryptographic keys.

The term "cryptographic key" may include something used in encryption or decryption. As an example, a cryptographic key can refer to a product of two large prime numbers. A cryptographic key may serve as an input in a cryptographic process or cryptosystem, such as RSA or AES, and may be used to encrypt plaintext and produce a ciphertext output, or decrypt ciphertext and produce a plaintext output.

The term "plaintext" may include text that is in a plain form. For example, plaintext could refer to text which a human or a computer could read without any processing, such as the phrase "hello, how are you?" It may also refer to text which is in an unencrypted form. Numbers or other symbols may also qualify as plaintext.

The term "ciphertext" may include text that is that is in an encrypted form. For example, this could refer to text which must be decrypted before it can be understood by a human or computer. Ciphertext may be generated by any number of cryptographic algorithms, such as RSA or AES.

The term "multi-party computation" may include a computation which is performed by multiple participants. As an example, a multi-party computation may occur when multiple participants each have some of the required inputs to a computation. The term "secure multi-party computation" may refer to a multi-party computation which is secure. In many cases, this refers to a multi-party computation in which the participants do not share information or other inputs with one another.

An "enclave" may include a particular memory region of a secure environment. An "enclave program" or "enclave application," may refer to code or instructions executing within the enclave.

A "participant computer" may include a computer that is participating in a process. For example, a participant computer may include a computer that is participating in a multi-party computation or protocol. An "enclave participant computer" may refer to a participant computer that also possesses a secure environment. A "non-enclave participant computer" may refer to a participant computer that does not possess a secure environment.

A "broadcast" may include a process by which an entity transmits the same data to a number of other entities, typically simultaneously. Examples of broadcasts include television broadcasts. A "broadcast protocol" may refer to a protocol or methods used to achieve a broadcast. A broadcast protocol may comprise rules, safeguards, or steps to achieve one or more broadcast properties. For example, these properties may include guaranteeing that all recipients receive the same data in the broadcast.

A "hash" or "hash measurement" may include the output of a "hash function." A hash function may refer to a function that maps data of arbitrary size to fixed size values. For example, a hash function may be used to produce a hash measurement corresponding to a large program or data file, such that the hash measurement is smaller than the corresponding program or data file. Two programs or data files can be compared for equivalence by using their hash measurements, rather than by comparing the data files or programs themselves.

A "digital signature" may include cryptographic methods for verifying the authenticity of digital messages or documents. A digital signature may comprise data included in a message, encrypted using an entity (e.g., a participant computer's) private key. Other entities can verify the authenticity of the message by decrypting the data using the entity's known public key.

A "quote" may include a signed message. A quote may be used to verify a secure environment or any enclave programs operating on the secure environment. A quote may comprise a signed message containing a hash or hash measurement of an enclave program operating on the secure environment. The signature may correspond to the secure environment and/or the manufacturer of the secure environment. An entity (such as a participant computer), may verify the quote in order to determine whether the secure environment and the enclave program are legitimate.

BRIEF DESCRIPTION OF THE DRAWINGS

FIG. 4 shows a pseudocode representation of an exemplary host protocol application executed by a participant computer according to some embodiments.

FIG. 5 shows a pseudocode representation of an exemplary enclave program executed by a participant computer within a secure environment according to some embodiments.

FIG. 6E shows a sequence diagram of a fifth phase of an exemplary secure multi-party random number generation protocol according to some embodiments.

DETAILED DESCRIPTION

Figure 1:
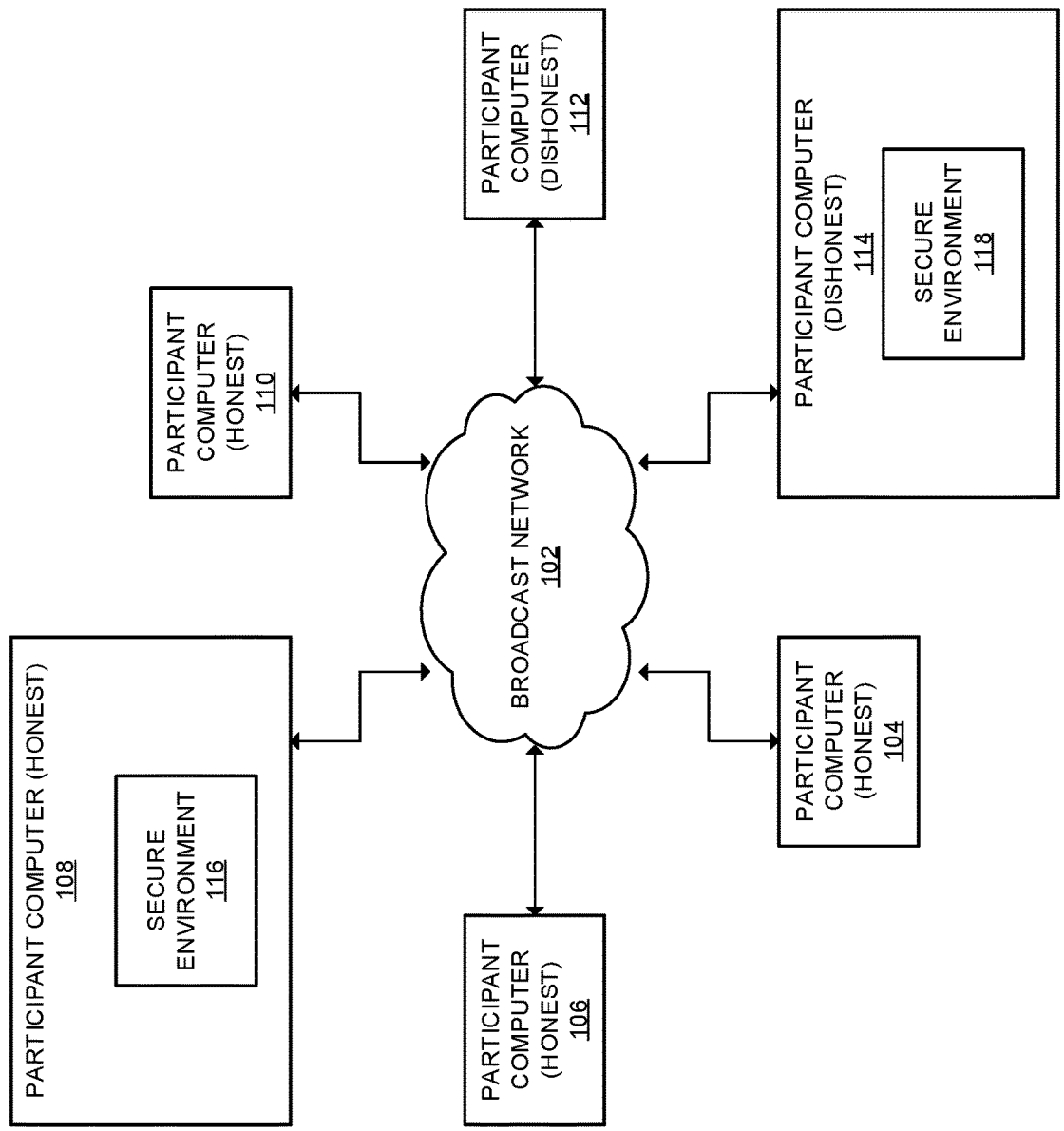
FIG. 1 shows a system block diagram of an exemplary broadcast network comprising honest and malicious participant computers according to some embodiments.

FIG. 1 shows a block diagram of an exemplary secure multi-party random number generation system according to some embodiments. The system comprises broadcast network 102 and participant computers 104-114. Some of the participant computers can be honest (in FIG. 1, participant computers 104-110) and some of the participant can be dishonest (in FIG. 1, participant computers 112-114). Some participant computers may possess or be associated with secure environments 116-118 (e.g., trusted execution environments, trusted platform modules, hardware security modules, etc.), such as participant computers 108 and 114. In one embodiment, the secure environments 116-118 are trusted execution environments.

Notably, although FIG. 1 shows six participant computers, two of which possess secure environments, four of which are honest, and two of which are dishonest, embodiments can be practiced with any number of honest and dishonest participant computers and any number of secure environments, subject to the condition that there are at least as many secure environments as dishonest (or suspected dishonest) participant computers. The number of secure environments and dishonest participant computers may be referred to as the "corruption threshold" or t.

The broadcast network 102 may comprise any network over which the participant computers can broadcast data to one another. The broadcast network 102 may comprise a communication network, which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the participant computers may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

It should be understood that in this disclosure, the term "broadcast network," or "network of participant computers" may comprise the participant computers (e.g., participant computers 104-114) in addition to any communication network or communication network infrastructure.

As stated above, some participant computers (e.g., participant computers 108 and 114) may possess or have access to secure environments (e.g., secure environments 116 and 118). A secure environment can include an isolated hardware or software region where data and software can be stored, processed, and executed. Examples of secure environments include trusted execution environments, trusted platform modules, and hardware security modules. Regions or subregions of memory in a secure environment may be referred to as an "enclave," and programs or applications that are operated or executed within a secure environment may be referred to as "enclave programs" or "enclave applications."

Generally, a secure environment is isolated, meaning that data and programs stored within the secure environment can only be accessed by secure, well defined channels (for example, a program operating on participant computer 108 outside secure environment 116 cannot access data stored within secure environment 116, except, for example, by calling a function or method of an enclave program operating within secure environment 116). Further, for a secure environment, trust is placed in the manufacturer of the environment (e.g., the manufacturer of the hardware security module, or processor implementing a trusted execution environment) and not the entity possessing the secure environment. Additionally, a secure environment may allow for remote attestation.

Remote attestation allows entities to verify or validate the secure environment or code executing on the secure environment. This may comprise, for example, verifying that the secure environment is actually manufactured by its stated manufacturer, or verifying the correctness or legitimacy of enclave programs operating on the secure environment. Remote attestation may be accomplished via quote functionality. A quote can comprise data, signed with a digital signature that can be publically verified. A quote can be verified using a "QuoteVerify" function that takes a quote as an argument and returns another signature and a bit indicating whether the quote is legitimate ("1" or "TRUE") or illegitimate ("0" or "FALSE"). Intel® SGX, for example, implements quote verification using an attestation service that verifies the quote in a group signature scheme and returns a publically verifiable quote $\sigma$. With Intel® SGX, any entity (e.g., participant computer) can verify $\sigma$ using Intel's public key.

A quote may additionally comprise a hash measurement of the enclave program that produced that quote, $\mu$(program). The hash measurement may be used to verify the correctness of the enclave program. For example, the honest participant computer 108 and the dishonest computer 114 may operate an enclave program within their respective secure environments 116 and 118. Under normal conditions, these enclave programs should be the same, however, in order to cheat the protocol, the dishonest participant computer 114 may operate a modified version of the enclave program. The hash measurement of the enclave program $\mu$(program) may be used by the honest participant computer 108 to determine that the dishonest participant computer 114 is not operating the correct version of the enclave program.

In one embodiment, the secure environments are trusted execution environments, secure areas on a central processing unit (e.g., Intel SGX). However, it should be understood that some embodiment may use other secure environments, provided they meet at least the criteria described above (i.e., isolation, trust placed in manufacturer, and remote attestation).

Figure 2:
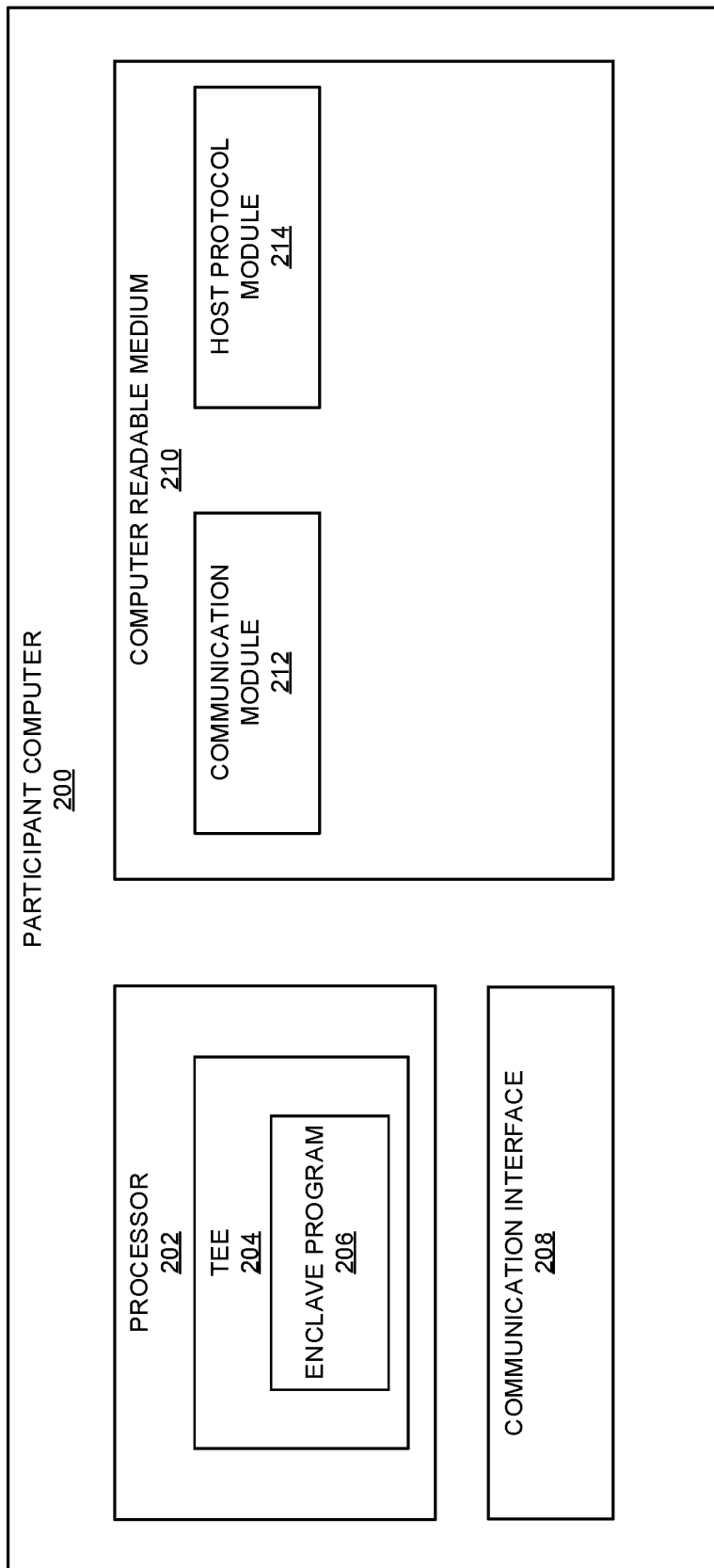
FIG. 2 shows a block diagram of an exemplary participant computer according to some embodiments.

FIG. 2 shows a system block diagram of a participant computer 200 according to some embodiments. The participant computer 200 may comprise a processor 202, a communications interface 208, and a computer readable medium 210. The computer readable medium 210 may comprise a number of software modules including a communication module 212 and a host protocol module 214, among others.

FIG. 2 shows a participant computer 200 possessing a secure environment in the form of a trusted execution environment 204. The trusted execution environment 204 may store an enclave program 206. It should be understood, as stated above, that the secure environment may be implemented in a form other than a trusted execution environment (e.g., a trusted platform module). Thus participant computer 200 is only one non-limiting example of a participant computer according to some embodiments.

The processor 202 may be any suitable processing apparatus or device as described above. In addition, the processor 202 may comprise trusted execution environment 204, an isolated environment for storing data and executing code or instructions in parallel with the operating system. Applications or programs operating within trusted execution environment 204 may be protected from user installed applications running in participant computer's 200 main operating system (e.g., communication module 212). The processor 200 may monitor memory access ensure that non-enclave software cannot access trusted execution environment 204. Further, the trusted execution environment 204 may encrypt data before writing it to memory such as DRAM. Additionally, the trusted execution environment 204 may use a "hardware root of trust," a set of private keys (also referred to as "endorsement keys" or "provisioned secrets") embedded directly into the processor 200 during manufacture (using, for example, one-time programmable memory).

The trusted execution environment 204 may store an enclave program 206. Enclave program 206, also referred to as "$prog_{fct}$" or "Efct" is described in further detail below with reference to FIG. 5, which displays a pseudocode representation of enclave program 206.

The communication interface 208 may comprise a network interface (e.g., an Ethernet interface, wireless network card, etc.) that enables the participant computer to communicate with other computers (e.g., other participant computers) or systems over a network such as the Internet.

Communication module 212 may comprise code that causes or enables processor 202 to generate messages, reformat messages, and/or otherwise communicate with other entities or computers. This may include broadcasting data to other participant computers as part of a broadcast protocol, receiving data from other participant computers (including via broadcast), or otherwise communicating with other participant computers (e.g., sending and receiving data via means other than broadcast). Communication module 212 may enable participant computer 202 to communicate over a network according to any appropriate communication protocol, such as TCP, UDP, etc.

Data (e.g., cryptographic keys or encrypted random bits) can be broadcast according to a broadcast protocol. A broadcast protocol can involve n parties (e.g., participant computers) in which one party is the "commander," "leader," or "dealer." The commander inputs or provides a message m that is transmitted to all n parties. Some broadcast protocols (e.g., Dolev-Strong) can achieve broadcast properties including "agreement" and "validity." The property of agreement states that all honest parties output the same value. For example, if all n parties are honest, the commander inputs the message m, transmits m to all n parties, and all n parties output the message m without modification. The property of validity states that all n parties output the message m if the commander is honest. That is, provided that the commander transmits the same message m to all n parties, all n parties will output the message m.

An example of a broadcast protocol, used in one embodiment is the Dolev-Strong broadcast protocol. A modified version of the Dolev-Strong broadcast protocol is described in R. Kumaresan "Broadcast and Verifiable Secret Sharing: New Security Models and Round-Optimal Constructions" *Dissertation Submitted to the Faculty of the Graduate School of the University of Maryland*, pages 11-12.

The Dolev-Strong broadcast protocol can proceed in a series of rounds. Each participating party maintains an accepted set of messages and a set of digital signatures. Initially, the commander transmits the message m as well as a signed copy of the message m to all parties. The signed copy allows all parties to verify that the message m came from the commander.

In each round, upon receiving a new, unaccepted message v (from any participant) with a number of valid signatures greater than or equal to the round number (including a signature corresponding to the commander), the party will "accept" the message v by adding the message v to the accepted set of messages and the signatures to the set of signatures. The party will then sign the newly accepted message v, then transmit v, sign(v), and the set of signatures to all other parties. The Dolev-Strong protocol will proceed for t+1 rounds, where t is the corruption threshold as described above.

In a case where the commander is honest (i.e., the commander follows the protocol and transmits the same message m to all participants), each participant will receive the message m, then accept the message m by adding it to the accepted set of messages and adding the signed copy to the set of signatures. Each participant will then sign the message m, and transmit m, the set of signatures, and sign(m) to each other participant. In the subsequent round, each participant computer will have received m, the set of signatures, and sign(m) from all other participants. However, because m has already been added to the set of accepted messages, it is no longer a new, unaccepted message, and the participant computers will not send any more messages to one another. The protocol will eventually terminate on round t+1 with only the message m being accepted, and each participant computer will output m, demonstrating the principle of validity.

In an alternative case, where the commander is dishonest, multiple parties may receive different messages, each signed by the commander. Each party will accept the message they receive into their own accepted set of messages, sign it, and forward it along with the set of signatures and the party's own signature to all other parties. Eventually, each party will have accepted multiple different messages (corresponding to the messages sent by the dishonest commander) into their accepted set of messages. At this point, because each of the multiple different messages have valid signatures, each party knows that the commander sent different messages to different participants, and thus acted dishonestly. Honest parties can output a consistent value indicating this dishonesty, such as "FALSE," demonstrating an example of the principle of agreement.

As stated above, in one embodiment, the Dolev-Strong broadcast protocol is used for broadcasting during secure multi-party random number generation. However, embodiments of the invention can be practiced with any other appropriate broadcast protocol meeting the properties of agreement and validity, e.g., a Pease-Shostak-Lam port broadcast protocol.

Returning to FIG. 2, the computer readable medium 210 also may comprise a host protocol module 214. The host protocol module 214 may comprise code or software, executable by the processor 202 for implementing steps associated with performing the secure multi-party random number generation protocol according to embodiments. The host protocol module 214 may also be referred to as $Prot_{fct}$ or the "host protocol application," and is described in more detail below with reference to FIG. 4, which displays a pseudocode representation of the host protocol module 214.

Generally, each participant computer in the network of participant computers can execute the host protocol module 214. Enclave participant computers (e.g., those with secure environments such as trusted execution environment 204) can also execute the enclave program 206 from within the trusted execution environment. The host protocol software 214 communicates to the enclave program 206 via calling functions or methods associated with enclave program 206. As an example, during the first stage of the multi-party random number generation protocol, the host protocol module 214 instructs the enclave program 206 to generate an enclave key pair by calling the "genKey" function (see line 408 of FIG. 4 and lines 502-506 of FIG. 5). Non-enclave participant computers (i.e., those without secure environments such as trusted execution environment 204) can skip the portions of the host protocol module 214 that involve calling these functions.

Methods according to embodiments are described below with reference to the method flowchart of FIGS. 3A-3C, the $prot_{fct}$ pseudocode of FIG. 4, enclave program ($prog_{fct}$ or $\varepsilon_{fct}$) pseudocode of FIG. 5 and the sequence diagrams of FIGS. 6A-6E, when applicable. FIGS. 6A-6E depict actions performed by participant computers in an exemplary broadcast network comprising four participant computers, including two enclave participant computers 602 and 604, and two non-enclave participant computers 606 and 608. It is understood that these figures are illustrative and that any suitable number of participant computers may be used in embodiments.

Figure 3A:
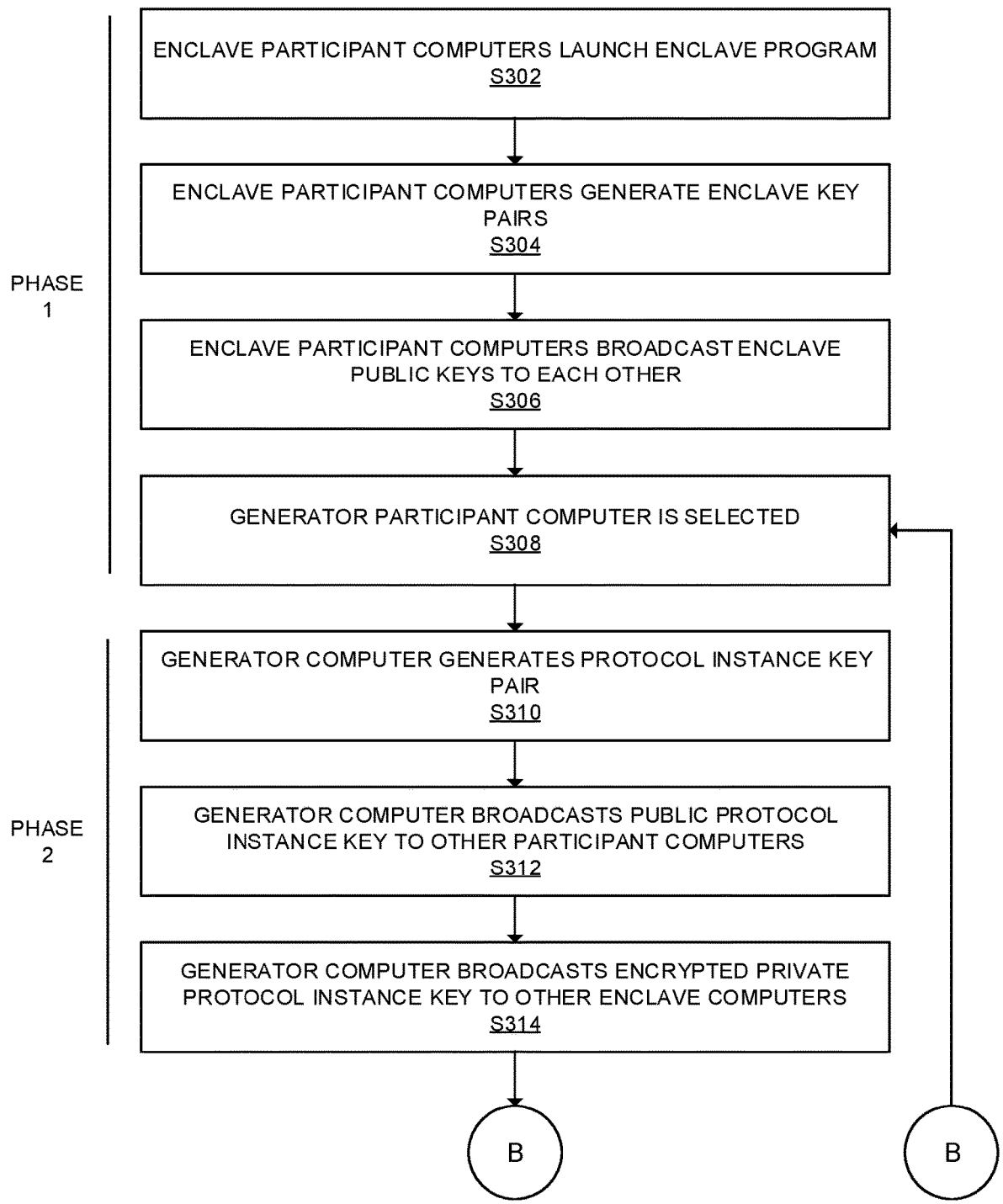
FIG. 3A shows a flowchart of a first part of an exemplary secure multi-party random number generation protocol according to some embodiments.
Figure 6A:
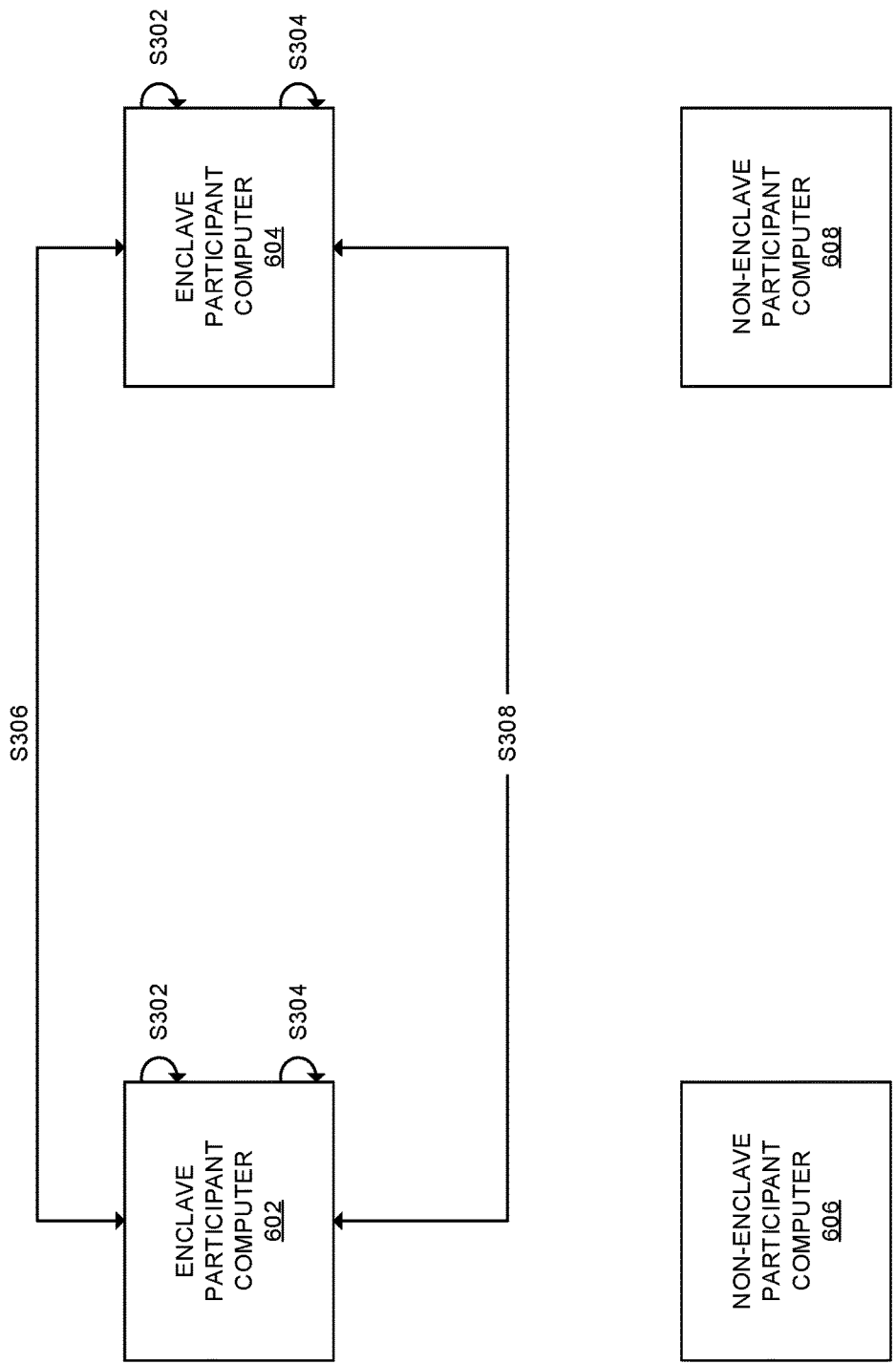
FIG. 6A shows a sequence diagram of a first phase of an exemplary secure multi-party random number generation protocol according to some embodiments.

Referring to FIGS. 3A, 4, and 6A, phase one of the protocol comprises steps S302-S308, corresponding to lines 402-412 of the pseudocode of FIG. 4. The first phase of the protocol comprises the enclave participant computers loading $prog_{fct}$ ($\varepsilon_{fct}$) into each of their secure environments. The enclave participant computers also each generate enclave key pairs. The enclave key pairs can allow a private protocol instance key (generated in phase two) to be securely distributed to each of the secure environments. Additionally, phase one comprises selection of the initial generator participant computer.

In the pseudocode representations of FIGS. 4-5, numeric subscripts are used to identify different participant computers or groups of participant computers. For example, participant computer 3 is represented by $p_3$. The number n refers to the total number of participant computers, and the number t is the number of participant computers that possess secure environments (e.g., trusted execution environments). These participant computers are also referred to as enclave participant computers. In FIGS. 4-5 the participant computers are ordered such that the first t participant computers are enclave participant computers, and the remaining t+1→n participant computers are non-enclave participant computers. Thus the set $[p_1, \ldots, p_n]$ refers to all participant computers, the set $[p_1, \ldots, p_t]$ refers to all enclave participant computers, and the set $[p_{t+1}, \ldots, p_n]$ refers to all non-enclave participant computers. A variable such as $q_1$ (e.g., see line 410 of FIG. 4) refers to a quote generated by participant computer $p_1$, and the same is true for example with bits ($b_i$), encrypted bits ($eb_i$), public keys ($pk_i$), etc.

At step S302, the enclave participant computers ($p_1 \rightarrow p_t$) load the enclave program ($\varepsilon_{fct}$ or $prog_{fct}$) into their respective secure environments and launch $prog_{fct}$. A participant computer may check its index i, or otherwise determine whether or not it has a trusted execution environment (FIG. 4, line 404). If the computer is an enclave participant computer (i≤t), the enclave participant computer can execute the HW.Load function with argument $prog_{fct}$ (FIG. 4, line 406). This function loads $prog_{fct}$ into the secure environment, gives it an enclave id (also referred to as an eid) e and returns the enclave id e. Step S302 is also depicted being performed by enclave participant computers 602 and 604 in the sequence diagram of FIG. 6A.

At step S304, the enclave participant computers can each generate enclave key pairs within their respective secure environments. The enclave key pairs can comprise an enclave public key and an enclave private key, and the enclave private keys can be stored within the secure environments. The enclave participant computers can generate the enclave key pairs by calling the HW.Run function with arguments e and "genKey" at line 408 of the host protocol prot$_{fct}$. This instructs the enclave program prog$_{fct}$ to execute the "genKey" function, shown at lines 502-506 of FIG. 5. Step S304 is likewise shown being performed by enclave participant computers 602 and 604 in FIG. 6A.

The "genKey" function generates an enclave key pair comprising an enclave public key epk and an enclave private key esk using a public key encryption key generation function (line 504, FIG. 5). It then returns a quote comprising the enclave public key to the host protocol application prot$_{fct}$. As stated above, quotes may comprise data (e.g., the enclave public key) and a hash measurement of the enclave program (e.g., $\mu(\varepsilon_{fct})$ or $\mu(prog_{fct})$) signed using a secret key embedded in the secure environment. Any participant computer can verify the enclave program by comparing the hash measurement to a hash measurement of a valid instance of the program. Likewise, any participant can verify the secure environment using a remote attestation service, as described above. Returning to FIG. 4, at line 408, the enclave computers assign the quote to message placeholder variable "msg."

At step S306, the enclave participant computers broadcast their quotes comprising the enclave public keys (and optionally signed quotes which may be first signed quotes) to the one or more other enclave participant computers in the network of participant computers. Step S306 is also shown being performed by participant computers 602 and 604 in FIG. 6A, as well as at line 410 of FIG. 4, where enclave participant computers [$p_1, \ldots, p_t$] engage in multiple, simultaneous Dolev-Strong broadcasting protocols (Prot$_{DS}$). In effect, each enclave participant computer acts as a commander and broadcasts their respective quote ($q_1$, $q_2$, etc.) to each other enclave participant computer. Likewise, implicitly, each of the enclave participant computers receive one or more quotes (and one or more enclave public keys) from the one or more other enclave participant computers. As a result of the Dolev-Strong broadcasting protocols, each enclave participant computer now possesses a vector of quotes [$q_1, \ldots, q_t$], each quote corresponding to an enclave public key for a particular enclave participant computer.

At step S308, a generator participant computer is selected. The generator participant computer may refer to the participant computer assigned to generate the protocol instance key pair (comprising a private protocol instance key and a public protocol instance key), store the private protocol instance key in a secure environment, and distribute the public protocol instance key to the other participant computers. The public protocol instance key can be used by all participant computers to encrypt generated random bits before broadcasting those random bits to all other participant computers. The private protocol instance key, once released, can be used by the participant computers to decrypt the encrypted random bits, and the decrypted random bits can then be used to calculate the output random bit. Because the private protocol instance key is initially stored within the secure environment, the generator participant computer is an enclave participant computer, and therefore is selected from among the enclave participant computers. Like the preceding steps of the first phase of the protocol, step S308 is also depicted in FIG. 6A.

Because no assumptions are made about which participant computers are dishonest, it is possible that a dishonest participant computer is selected to be the generator participant computer. Fortunately, if a dishonest participant computer becomes the generator participant computer, this can be detected later in the protocol and a new generator participant computer can be selected. Thus the criteria for selecting a generator participant computer can be that the candidate participant computer possesses a secure environment (i.e., it is an enclave participant computer), and was not previously selected to act as the generator participant computer. Embodiments can be practiced with any selection process that meets this criteria. As a simple example, shown in FIG. 4 at line 412, the first participant computer, $p_1$ can be selected to be the generator participant computer. Then, if the first participant computer turns out to be dishonest, the second participant computer can be selected to be the generator participant computer, and so forth, until either an honest generator participant computer is selected or all enclave participant computers are known to be dishonest.

Phase two of the protocol can involve the generator participant computer generating the protocol instance key pair, broadcasting the public protocol instance key to all participant computers, and encrypting and broadcasting the private protocol instance key to the enclave participant computers using the enclave public keys generated in phase one. Further, during phase two, the participant computers verify whether the generator participant computer was honest during the broadcast of the protocol instance key material. If the generator participant computer was dishonest, a new generator participant computer is selected and phase two is repeated. In the special case where all enclave participant computers are dishonest, the remaining non-enclave participant computers execute an honest variant of the secure multi-party random number generation protocol Prot$_{HFCT}$ (described in more detail below). Phase two of the protocol can be better understood with references to FIGS. 3A-3B, FIGS. 4-5, and FIG. 6B.

At step S310, the generator participant computer generates, within its secure environment, a protocol instance key pair comprising a public protocol instance key and a private protocol instance key, wherein the private protocol instance key is stored within the secure environment. Step S310 is also shown in FIG. 4 at line 418, in which the generator computer executes the HW.Run function with arguments e (the enclave ID), "genProtKey", and the vector of quotes [$q_1, \ldots, q_t$]. The output of the function is assigned to the message placeholder variable msg. Likewise, step S310 is shown being performed by generator participant computer 602 of FIG. 6B.

The "genProtKey" function, shown in FIG. 5, lines 516→530 comprises a number of steps. First, the input quotes are separated into their respective hash measurements $\mu_1 \rightarrow \mu_t$ and enclave public keys epk$_1 \rightarrow$epk$_t$ (lines 518-520). At line 522, the enclave program prog$_{fct}$ verifies the validity of the hash measurements by comparing them to one another and a known valid hash $\mu(\varepsilon_{fct})$. Assuming that each enclave participant computer is running a correct instance of the enclave program, the hash measurements $\mu_1 \rightarrow \mu_t$ should be identical to each other and the valid hash $\mu(\varepsilon_{fct})$. If not, prog$_{fct}$ deliberately terminates at the assert line 522.

Further, at line 524, prog$_{fct}$ checks the validity of the quotes (e.g., first signed quotes) themselves using the HW.QuoteVerify function, to verify, using remote attestation, that the quotes originated from real secure environments, as described above. If all the quotes evaluate as valid (e.g., the output of the HW.QuoteVerify function is "TRUE"), prog$_{fct}$ can proceed, otherwise, prog$_{fct}$ deliberately terminates at the assert line 524.

Subsequently at line 526, assuming both checks are successful, the generator participant computer generates (via prog$_{fct}$) the protocol instance key pair (pk, sk) comprising public protocol instance key pk and private protocol instance key sk using a public key encryption key generator.

At line 528, prog$_{fct}$ prepares an output variable "out." The output variable comprises both the public protocol instance key pk and one or more encrypted private protocol instance keys. Each copy of the private protocol instance key is encrypted with a different enclave public key (epk$_1$→epk$_t$). By encrypting the private protocol instance key with enclave public keys for which the corresponding enclave private keys are stored only within the secure environments, the generator participant computer can later broadcast the encrypted private protocol instance key to each enclave participant computer, such that the encrypted private protocol instance keys can only be decrypted within the secure environments.

Next, at line 530, prog$_{fct}$ generates a quote of the output variable and returns the quote to the host protocol application prot$_{fct}$.

Returning to FIGS. 3A and 6B, at step S312 the generator participant computer broadcasts the public protocol instance key to one or more other participant computers. The generator participant computer can broadcast the public protocol instance key using any suitable broadcasting protocol as described above. In one embodiment, the generator participant computer broadcasts the public protocol instance key using the Dolev-Strong broadcasting protocol (Prot$_{DS}$). In one embodiment, instead of broadcasting the public protocol instance key, the generator participant computer broadcasts a signed quote (e.g., a second signed quote) comprising the public protocol instance key and a hash measurement of the enclave program. Subsequently, in phase three, the one or more other participant computers can generate one or more encrypted random bits, the one or more encrypted random bits comprising random bits encrypted with the public protocol instance key.

At step S314, the generator participant computer broadcasts the one or more encrypted private protocol instance keys to the one or more enclave participant computers. In one embodiment, the generator participant computer instead broadcasts a signed quote comprising the encrypted private protocol instances keys, rather than broadcasting the one or more encrypted private protocol instance keys themselves. Step S314 is also shown being performed by generator participant computer 602 in FIG. 6B.

In some embodiments, the generator participant computer may broadcast the quote comprising the public protocol instance key and the one or more encrypted private protocol instance keys in a single broadcast protocol. This is shown in FIG. 4 at line 420, at which the Dolev-Strong broadcast protocol is invoked with input msg, containing the quote of the public protocol instance key and the encrypted private protocol instance keys.

Figure 6B:
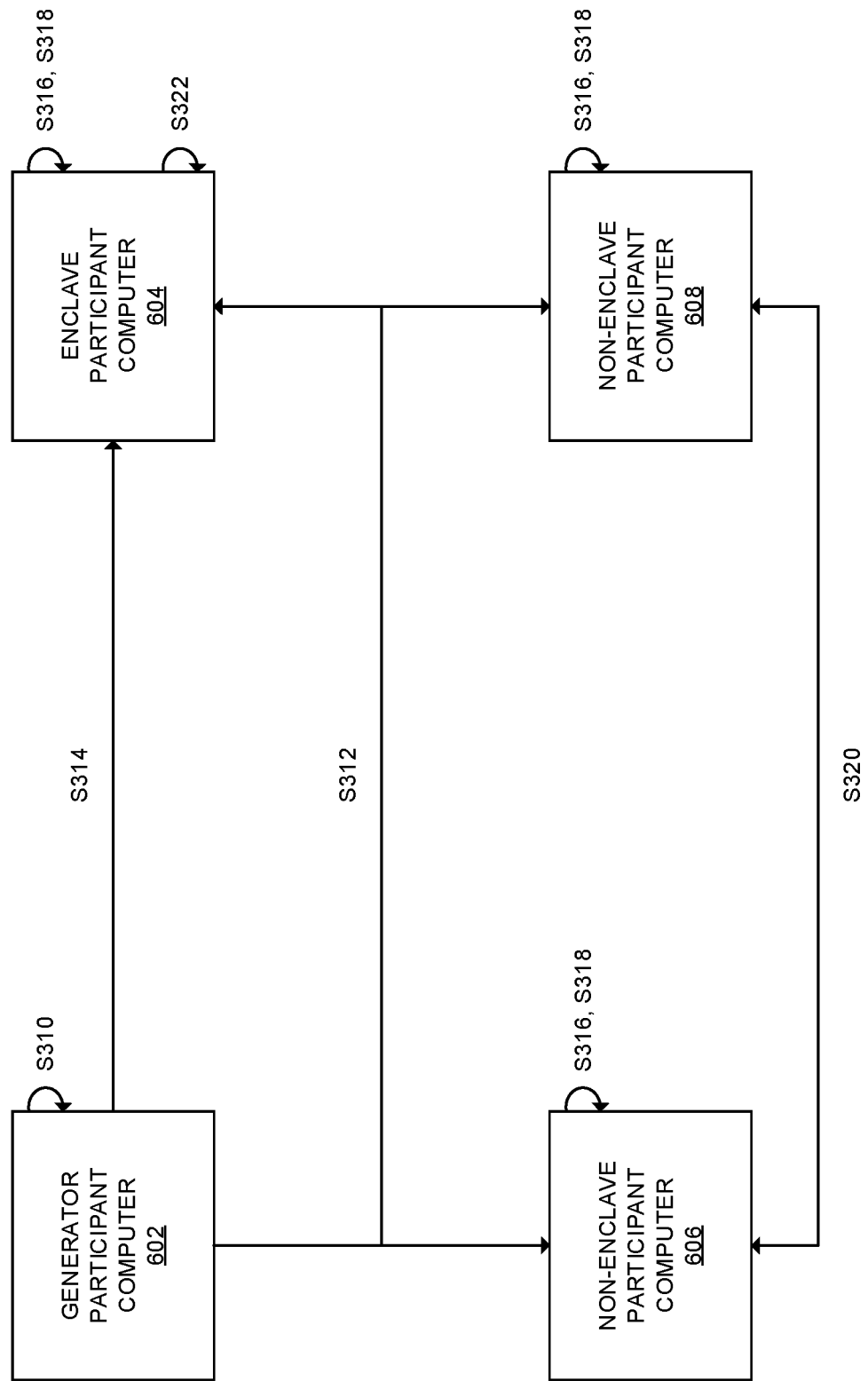
FIG. 6B shows a sequence diagram of a second phase of an exemplary secure multi-party random number generation protocol according to some embodiments.

At step S316, the participant computers determine whether the generator participant computer behaved dishonestly, for example, by transmitting different public protocol instance keys to different participant computers. The participant computers can determine if the generator public computer is dishonest based on the results of the Dolev-Strong protocol, as described above. If the generator computer is dishonest, honest participant computers can output a value indicating this dishonesty (e.g., "FALSE") and the flowchart can proceed to step S318. Otherwise, if the generator computer was honest, the flowchart proceeds to step S322. FIG. 6B depicts enclave participant computer 604 and non-enclave participant computers 606 and 608 performing step S316.

At step S318, the host protocol application Prot$_{fct}$ checks if there are other candidate generator participant computers. As stated above, a candidate generator participant computer is an enclave participant computer that has not yet been selected as the generator participant computer. If there are other candidate generator computers, the flowchart proceeds back to step S308 in FIG. 3A and a new generator participant computer is selected. Alternatively, the flowchart can proceed back to any step before step S308 (e.g., steps S302-S306) as part of selecting a new generator participant computer. Additionally, in some embodiments, the host protocol application Prot$_{fct}$ and/or the enclave program prog$_{fct}$ may track a "round number" associated with the protocol in order to verify correct operation of the protocol (see, e.g., lines 534 and 540 of FIG. 5, described below). Step S318 may additionally comprise resetting the round number, or setting the round number to a specific value (e.g., t+1), in order to achieve accurate round number checks later during the protocol. If there are no more candidate generator computers, the flowchart proceeds to step S320. FIG. 6B depicts enclave participant computer 604 and non-enclave participant computers 606 and 608 performing step S318.

At step S320, if there are no more candidate generator participant computers, the non-enclave participant computers execute an honest variant of the secure multi-party random number generation protocol (see also line 432 of FIG. 4). An "honest variant" of the protocol comprises a protocol to generate an output random bit wherein it is assumed that all participant computers are honest. As a result, it may not be necessary to encrypt data (such as random bits) or use secure broadcast protocols such as Dolev-Strong, as the honest participant computers may not attempt to cheat. As one example of an honest variant of the protocol, each non-enclave participant computer can generate a random bit and transmit it, unencrypted to each other non-enclave participant computer. Each participant computer can then calculate the XOR of all the random bits to produce the output random bit. As another example, one of the non-enclave participant computers can be selected (randomly or otherwise) to generate an alternative output random bit and transmit the alternative output random bit to the other non-enclave participant computers. Non-enclave participant computers 606 and 608 are depicted performing step S320 in FIG. 6B.

The honesty of the non-enclave participant computers can be assumed because of the corruption threshold t assumption. As stated above, it is assumed that there are at least as many secure environments (e.g., trusted execution environments) as there are dishonest participant computers, and therefore there are at least as many enclave participant computers as dishonest participant computers. In the worst case scenario, there are exactly as many enclave participant computers as dishonest participant computers.

Therefore, in the worst case scenario, there are two possible situations to consider. In the first (and more likely) situation, some of the enclave participant computers are dishonest and some of the non-enclave participant computers are dishonest. As a result, at least one enclave participant computer must be honest. If this is the case, eventually the honest enclave participant computer will be selected to act as the generator participant computer. Once this happens, the public protocol instance key can be generated and distributed correctly and the protocol can proceed as normal.

In the second situation all enclave participant computers are dishonest. However, this means that all non-enclave participant computers must be honest, because it is assumed that at worst, there are an equal number of enclave participant computers and dishonest participant computers. This enables the non-enclave participant computers to perform the honest variant of the protocol without any security issues.

At step S322, the enclave participant computers load the private protocol instance key into their respective secure environments. This can be accomplished by calling the HW.Run function with arguments e (the enclave ID), "loadKey" and the quote corresponding to the one or more encrypted private protocol instance keys (e.g., in the message placeholder variable "msg") as shown in FIG. 4 at line 428. Step S322 is shown in FIG. 6B as being performed by enclave participant computer 604.

Referring to FIG. 5, the "loadKey" function is shown at lines 508-514. Generally, the load key function involves verifying the correctness of the hash measurement corresponding to the generator public computer p is identical to the hash measurement corresponding to a legitimate instance of the enclave program μ(Efct), and that the quote is legitimate (see line 512 of FIG. 5). If the hash measurement p is correct and the quote is legitimate, the enclave program $prog_{fct}$ decrypts the corresponding encrypted private protocol instance key $ct_i$ using the corresponding enclave private key $esk_j$ and stores the result in the secure environment (see line 514 of FIG. 5).

By the end of phase two of the protocol, one of the following scenarios may have occurred: Either the non-enclave participant computers have executed an honest variant of the protocol (obviating the need to complete the rest of the protocol), or an honest generator participant computer has distributed the public protocol instance key to the participant computers and the private protocol instance keys to the secure environments. If the second scenario occurs, the protocol can proceed to phase three and step S324. Phase three of the secure multi-party random number generation protocol is depicted in FIGS. 3B-3C, FIGS. 4-5, and FIG. 6C.

Figure 6C:
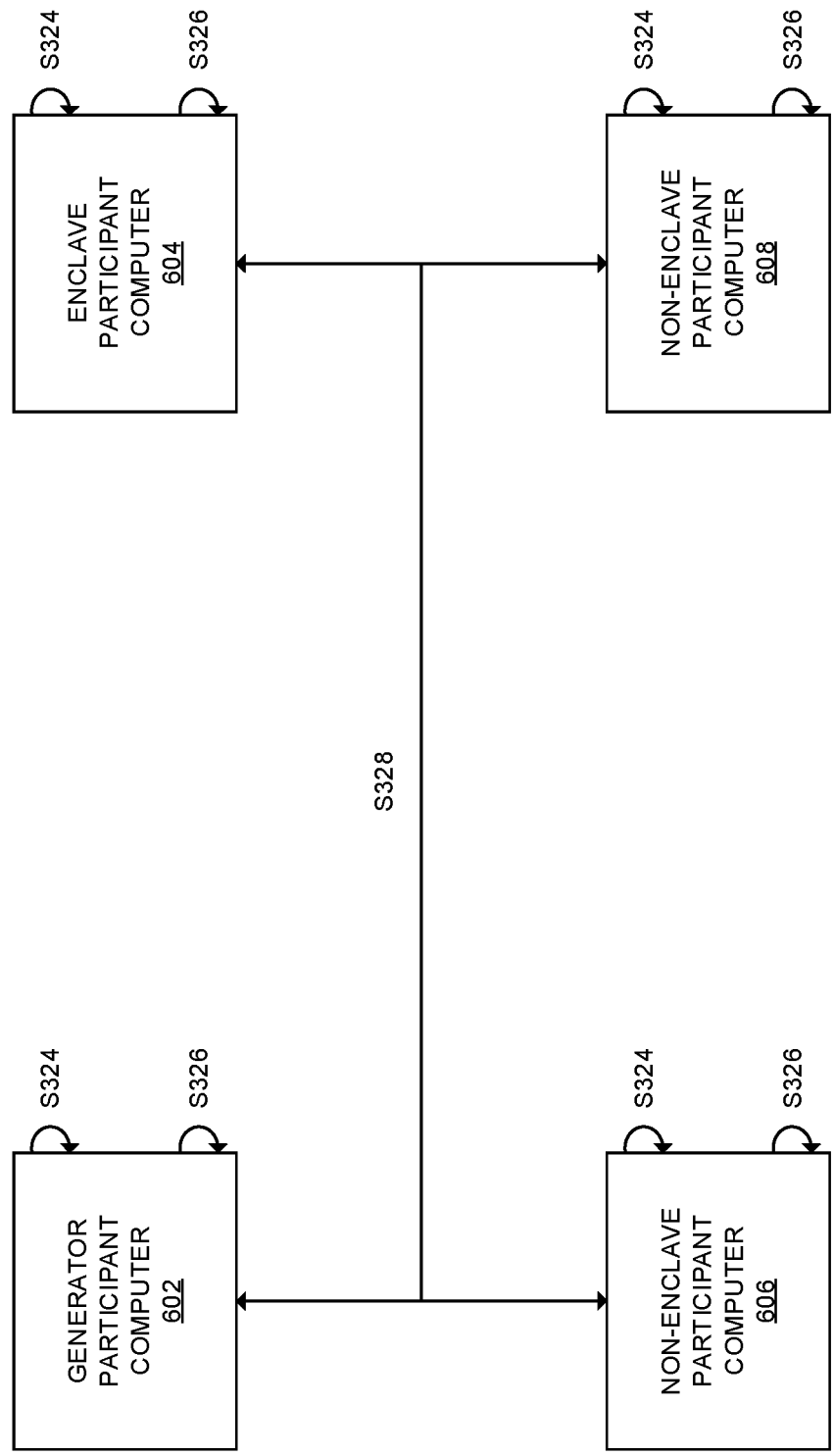
FIG. 6C shows a sequence diagram of a third phase of an exemplary secure multi-party random number generation protocol according to some embodiments.

At step S324, each participant computer generates a random bit. The participant computers can use any appropriate method for generating random bits, such as a random or pseudorandom number generator. One or more dishonest participant computers may not generate truly random numbers. However, the output random bit can be random even if some of the random bits used to calculate the output random bit are not random. For example, when the output random bit is calculated as the XOR of multiple input random bits, only one input random bit actually needs to be random in order for the output random bit to be random, provided that the non-random bits are not dependent on the random bit. In FIG. 6C, step S324 is shown being performed by the generator participant computer 602, the enclave participant computer 604, and the non-enclave participant computers 606-608. A random bit generated by the generator participant computer 602 may optionally be referred to as "another random bit" to differentiate it from random bits generated by the non-generator participant computers.

At step S326, the participant computers encrypt their random bits with the public protocol instance key and digitally sign the encrypted random bits using a private key corresponding to a public key known to all other participant computers. The digital signature allows other participant computers to verify the source of the encrypted random bit. In FIG. 6C, step S326 is shown being performed by the generator participant computer 602, the enclave participant computer 604, and the non-enclave participant computers 606-608. A random bit generated by the generator participant computer 602 may optionally be referred to as "another encrypted random bit" to differentiate it from random bits encrypted by the non-generator participant computers.

Figure 3B:
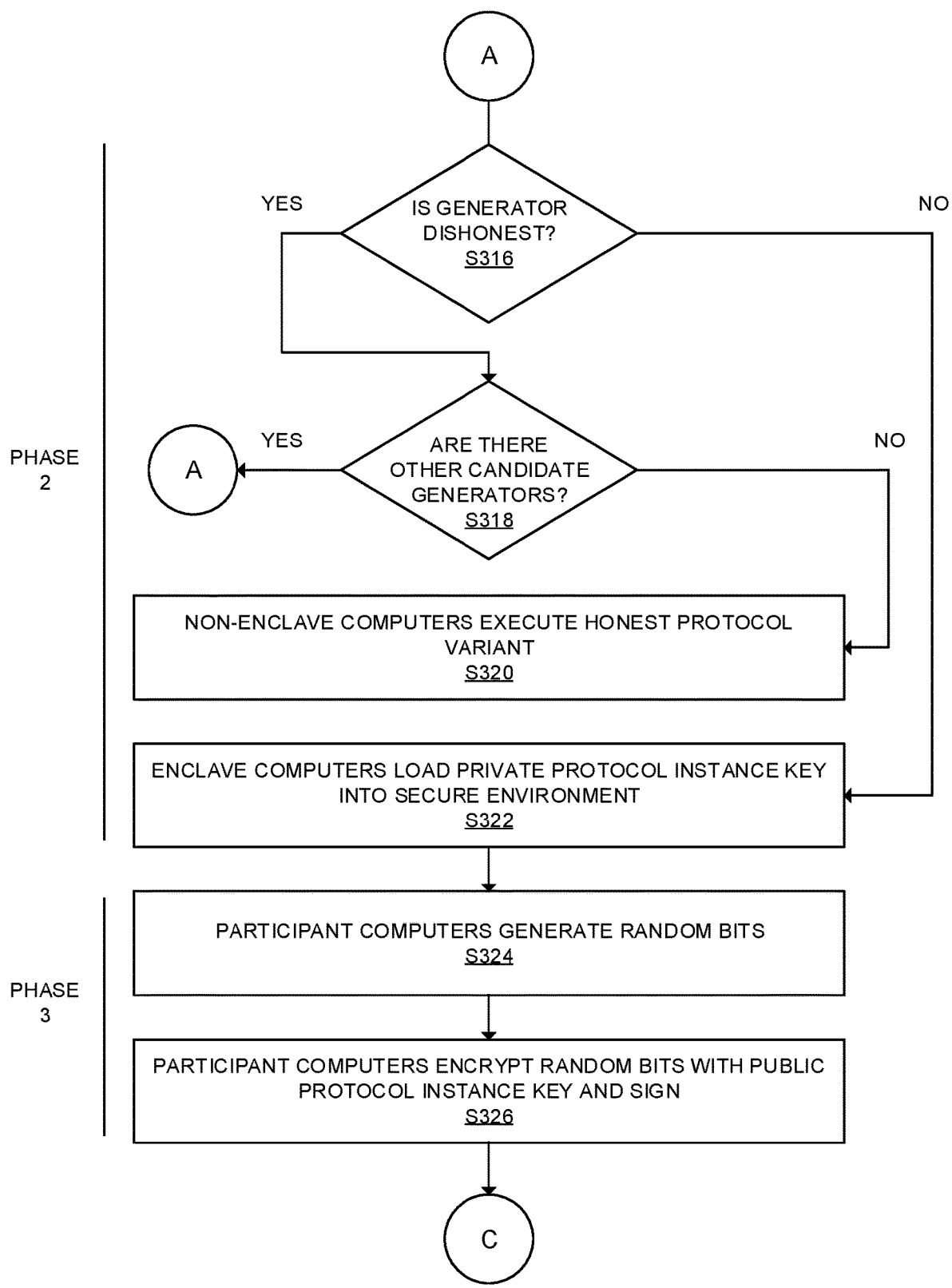
FIG. 3B shows a flowchart of a second part of an exemplary secure multi-party random number generation protocol according to some embodiments.

Referring to FIG. 3B, at step S328, the participant computers broadcast the encrypted random bits to each other, using multiple simultaneous Dolev-Strong broadcast protocols with each participant computer acting as a leader or commander in their own instance of the protocol. Implicitly, each participant computer then receives the encrypted random bits from the other participant computers. Steps S322-S326 of FIG. 3 correspond generally to lines 438-440 of the pseudocode representation of $Prot_{fct}$ shown in FIG. 4. In FIG. 6C, step S328 is shown being performed by the generator participant computer 602, the enclave participant computer 604, and the non-enclave participant computers 606-608.

The next phases of the protocol, phase four and phase five relate to releasing the private protocol instance key and calculating and outputting the output random bit. In phase four, the private protocol instance key is released to the non-enclave participant computers. The non-enclave participant computers then use the private protocol instance key to decrypt the encrypted random bits and calculate the output random bit. In phase five, the enclave participant computers retrieve the private protocol instance key from their respective secure environments (e.g., trusted execution environments), decrypt the encrypted random bits then calculate the output random bit. Phase four of the protocol can be better understood with reference to FIGS. 3C, 4-5, and 6D.

Figure 3C:
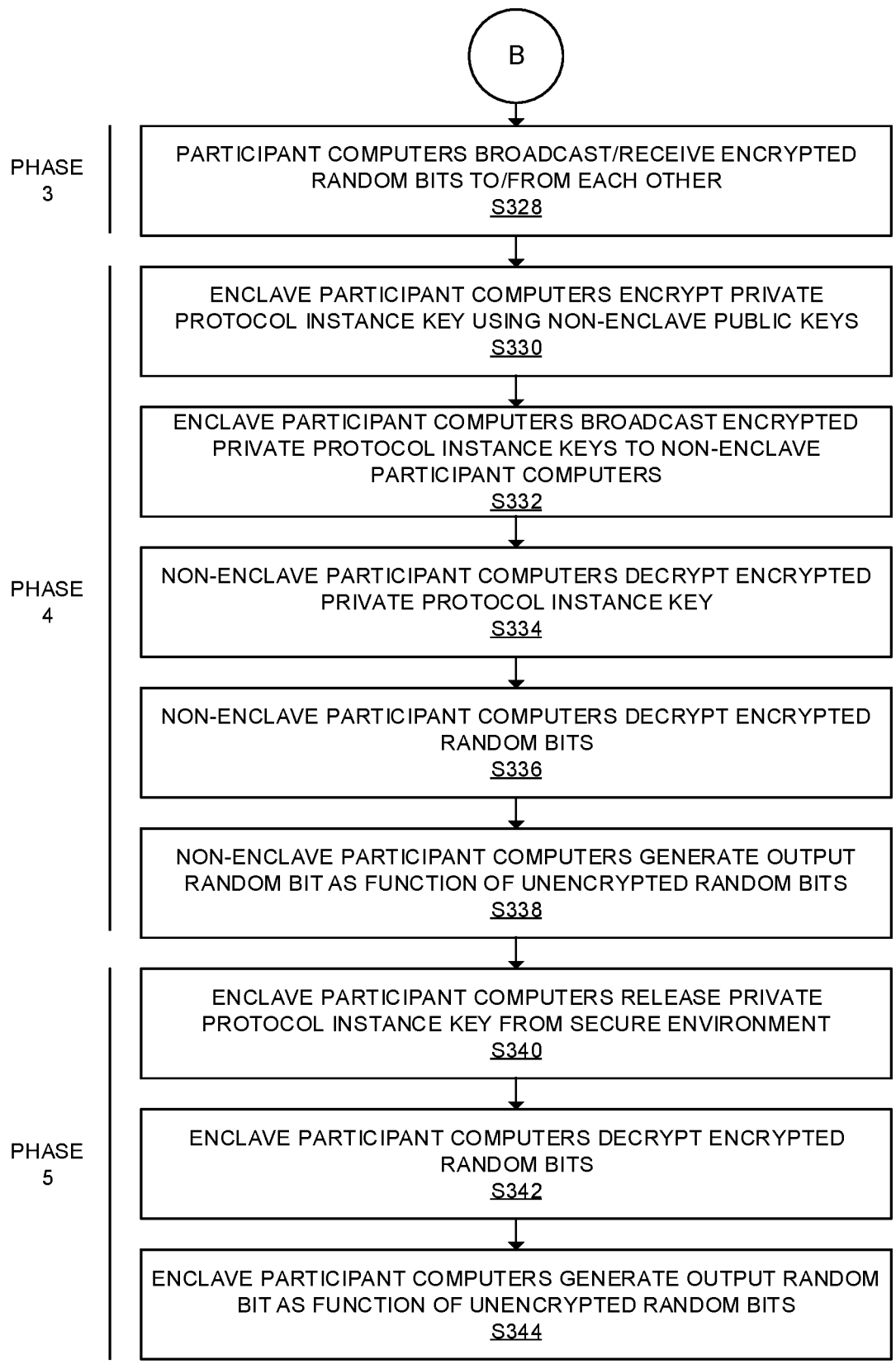
FIG. 3C shows a flowchart of a third part of an exemplary secure multi-party random number generation protocol according to some embodiments.

Referring to FIG. 3C, at step S330, the enclave participant computers encrypt the private protocol instance key using public keys corresponding to each of the non-enclave participant computers. This can be accomplished using the host protocol application $Prot_{fct}$. Referring to FIG. 4, at line 446, the enclave participant computers can execute the HW.Run function with arguments e (the enclave ID) and "revealKey1," storing the result in the message placeholder variable "msg." The HW.Run function instructs the enclave program $Prot_{fct}$ to execute the "revealKey1" function. Step S330 is likewise depicted as being performed by the generator participant computer 602 and enclave participant computer 604 of FIG. 6D.

Referring to FIG. 5, the "revealKey1" function comprises lines 532-536, and generally comprises two steps. The first step, at line 534 involves verifying that the secure multi-party random number generation protocol is on the correct round, i.e., round 3*t+4. As stated above, the Dolev-Strong protocol takes t+1 rounds, where t is the corruption threshold, i.e., the maximum number of dishonest participants. As indicated in FIGS. 3A-3B and FIG. 4, up until the point in the protocol when the "revealKey1" function has been called, three Dolev-Strong broadcast sets have occurred. The broadcast sets can include a first broadcast set when the enclave participant computers broadcast their enclave public key quotes to one another, a second broadcast set when the generator participant computer broadcast the quote comprising the public protocol instance key to the participant computers, and a third broadcast set when each participant computer broadcast their encrypted random bit to each other participant computer. The total number of rounds up until this point is three times the number of rounds involved in a single broadcast 3*(t+1)=3*t+3. The subsequent round is round 3*t+4, which is the round that the enclave program $prog_{fct}$ checks for at line 534. If the round number is not correct, it implies that there has been some error in the protocol up until that point, and $prog_{fct}$ terminates at line 534. Otherwise, at line 536, the enclave program $prog_{fct}$ returns a quote comprising the private protocol instance key sk encrypted using the public keys corresponding to each of the non-enclave participant computers ($pk_{t+1} \rightarrow pk_n$).

Returning to FIG. 3C, at step S332 the enclave participant computers broadcast the encrypted private protocol instance keys (or the quote comprising the encrypted private protocol instance keys) to the non-enclave participant computers, using a broadcast protocol such as Dolev-Strong. This step corresponds to line 448 of the FIG. 4 pseudocode. The non-enclave participant computers then receive the private protocol instance keys at line 452 of FIG. 4. Step S332 is also shown being performed by generator participant computer 602 and enclave participant computer 604 of FIG. 6D.

Figure 6D:
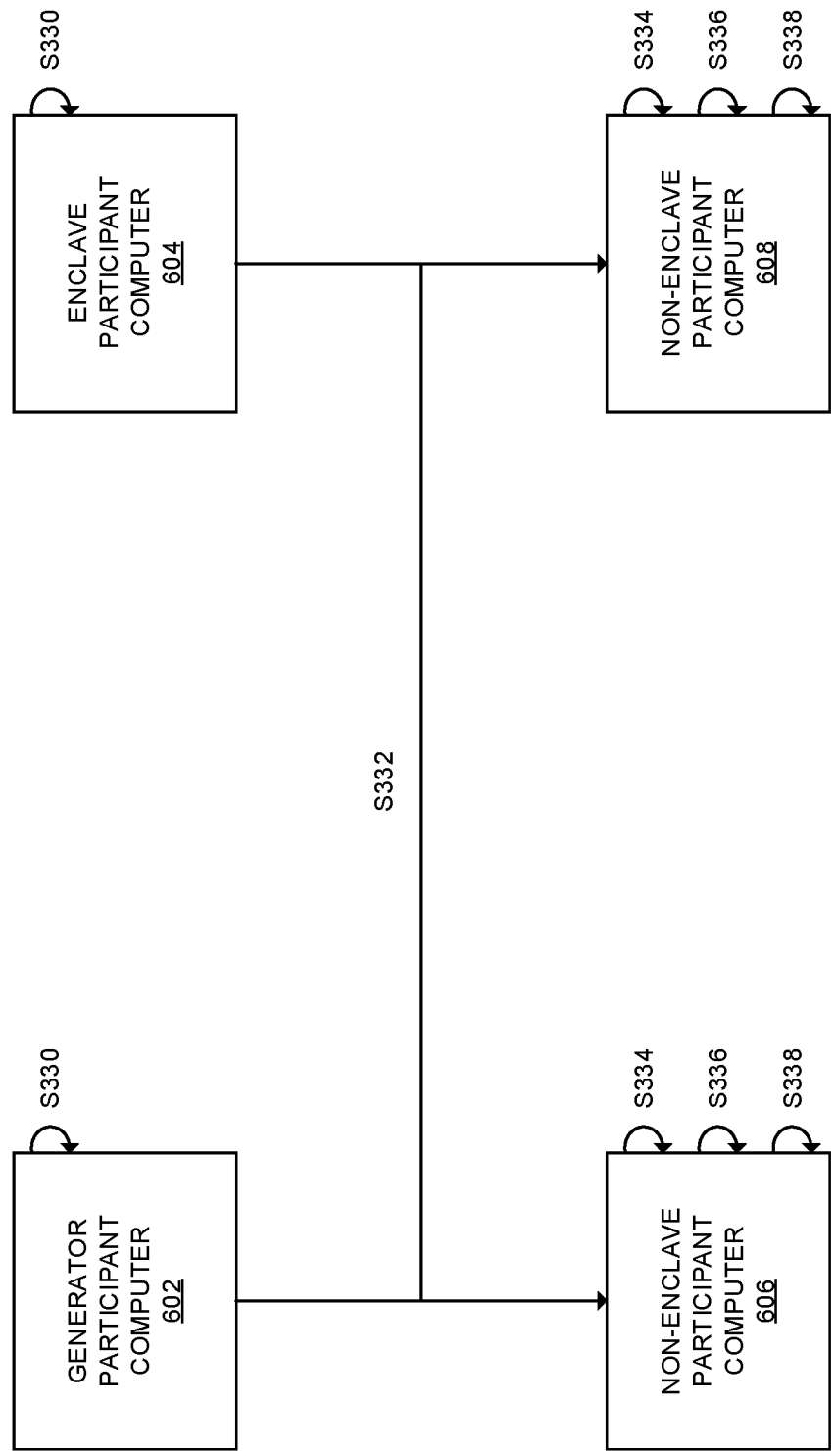
FIG. 6D shows a sequence diagram of a fourth phase of an exemplary secure multi-party random number generation protocol according to some embodiments.

Returning to FIG. 3C, at step S334 the non-enclave participant computers decrypt the private protocol instance key using the private keys corresponding to their public keys (line 454 of FIG. 4 and step S334 of FIG. 6D). These private and public keys may also be referred to as "non-enclave private keys," and "non-enclave public keys." Likewise, the encrypted private protocol instance keys may be referred to as "non-enclave encrypted private protocol instance keys." At this point, the non-enclave participant computers can decrypt the encrypted random bits.

At step S336, the non-enclave participant computers decrypt the encrypted random bits using the private protocol instance key decrypted at step S332. Step S336 is also depicted in FIG. 6D being performed by non-enclave participant computers 606 and 608.

Subsequently, at step S338, the non-enclave participant computers generate the output random bit as a function of the unencrypted random bits (see also FIG. 6D). In one embodiment, the function of the unencrypted random bits is a XOR function of the unencrypted random bits. The XOR function is preferable because the output random bit is random even if some of the bits used to calculate the output random bit were non-random. However, embodiments can use any appropriate function of the unencrypted random bits to calculate the output random bit, e.g., the XNOR function.

At this point in the protocol, the non-enclave participant computers have calculated the output random bit. In the following phase (phase five), the enclave public computers release the private protocol instance key from their respective secure environments, decrypt the encrypted random bits, and calculate the output random bit. Phase five can be understood with reference to FIGS. 3C, 4-5, and 6E.

At step S340, the enclave participant computers release the private protocol instance key from their respective secure environments. This may be accomplished using the host protocol application and calling the HW.Run function with arguments e (the enclave ID) and "revealKey2", as shown in FIG. 4 at line 466. The HW. Run function instructs the enclave program $prog_{fct}$ to execute the function "revealKey2".

Referring briefly to FIG. 5, the "revealKey2" function comprises lines 538→542. The "revealKey2" function comprises two steps. The first is verifying that the protocol is on the correct round number, round 4*t+6. Recall that each instance of the Dolev-Strong broadcast protocol may take t+1 rounds, and that the correct round number for the "revealKey1" function was round 3*t+4. After executing "revealKey1" a Dolev-Strong broadcast protocol is performed in order to broadcast the private protocol instance key to the non-enclave participant computers (as shown in FIG. 3C at step S322). If that broadcast protocol is executed correctly, it should end on round 3*t+4+(t+1)=4*t+5. Round 4*t+6 is the subsequent round. If the round number is not correct, the enclave application can terminate at line 540. Otherwise, $prog_{fct}$ can proceed to line 542, at which point the private protocol instance key sk can be returned to the host protocol application $prot_{fct}$.

Returning to FIG. 3C, at step S342, the enclave participant computers can decrypt the encrypted random bits using the private protocol instance key released at step S340.

Subsequently, at step S344, the enclave participant computers can generate the output random bit as a function (e.g., the XOR function) of the unencrypted random bits.

At this point, all five phases of the protocol have been completed, and each participant computer has successfully produced the same output random bit. At this point, each participant computer or the entities or owners associated with each participant computer can be sure that the output random bit was generated fairly and consistently across all participant computers, even in the presence of multiple dishonest participant computers. Optionally, the participant computers may compare the generated output random bits among one another in order to verify that they produced the same result.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
broadcasting, by a participant computer in a network of participant computers, a public protocol instance key to one or more other participant computers, wherein the one or more other participant computers generate one or more encrypted random bits, the one or more encrypted random bits comprising random bits encrypted with the public protocol instance key;
receiving, by the participant computer, the one or more encrypted random bits from the one or more other participant computers;
producing, by the participant computer, one or more unencrypted random bits by decrypting the one or more encrypted random bits using a private protocol instance key; and
generating, by the participant computer, an output random bit by using a function and at least the one or more unencrypted random bits, wherein the method further comprises:
before broadcasting, by the participant computer, to one or more other participant computers, the public protocol instance key:
generating, by the participant computer, within a secure environment, an enclave key pair comprising an enclave public key and an enclave private key, wherein the enclave private key is stored within the secure environment, and wherein one or more enclave participant computers in the network of participant computers generate one or more other enclave key pairs;
broadcasting, by the participant computer to the one or more enclave participant computers, the enclave public key;
receiving, by the participant computer, one or more other enclave public keys from the one or more enclave participant computers; and
generating, by the participant computer, within the secure environment, a protocol instance key pair comprising the public protocol instance key and the private protocol instance key, wherein the private protocol instance key is stored within the secure environment.

2. The method of claim 1, wherein the secure environment comprises a trusted execution environment or a trusted platform module.

3. The method of claim 1:
wherein broadcasting the enclave public key comprises broadcasting a first signed quote comprising the enclave public key and a hash measurement of an enclave program operating within the secure environment; and
wherein broadcasting the public protocol instance key comprises broadcasting a second signed quote comprising the public protocol instance key and the hash measurement of the enclave program.

4. The method of claim 3, wherein the one or more enclave participant computers verify the first signed quote using remote attestation and wherein the one or more other participant computers verify the second signed quote using remote attestation.

5. The method of claim 1, further comprising:
producing, by the participant computer, one or more encrypted private protocol instance keys by encrypting the private protocol instance key using one or more other enclave public keys; and
broadcasting, by the participant computer, the one or more encrypted private protocol instance keys to the one or more enclave participant computers.

6. The method of claim 5, wherein each of the one or more enclave participant computers loads the private protocol instance key into their respective secure environment by decrypting a corresponding encrypted private protocol instance key of the one or more encrypted private protocol instance keys using a corresponding enclave private key of the one or more other enclave key pairs.

7. The method of claim 1, further comprising broadcasting the output random bit to the one or more other participant computers.

8. The method of claim 1, wherein the participant computer comprises a generator participant computer, and wherein the generator participant computer is selected from the network of participant computers.

9. The method of claim 1, wherein broadcasting comprises participating in a Dolev-Strong broadcast protocol.

10. The method of claim 1, wherein broadcasting comprises participating in a Pease-Shostak-Lamport broadcast protocol.

11. The method of claim 1, wherein the function comprises an exclusive-or function.

12. The method of claim 1, wherein the function comprises an exclusive-nor function.

13. The method of claim 1, further comprising:
generating, by the participant computer, another random bit;
generating, by the participant computer, another encrypted random bit by encrypting the another random bit using the public protocol instance key; and
broadcasting, by the participant computer, the another encrypted random bit to the one or more other participant computers in the network of participant computers, wherein generating the output random bit comprises using the function of the at least the one or more unencrypted random bits and the another random bit.

14. The method of claim 13, further comprising:
producing, by the participant computer, one or more non-enclave encrypted private protocol instance keys by encrypting the private protocol instance key using one or more non-enclave public keys corresponding to one or more non-enclave participant computers; and
broadcasting, by the participant computer, the one or more non-enclave encrypted private protocol instance keys to the one or more other participant computers, wherein:
the one or more other participant computers also broadcast the one or more encrypted random bits to the one or more other participant computers, in addition to the participant computer,
the one or more non-enclave participant computers each decrypt the private protocol instance key using one or more non-enclave private keys corresponding to the one or more non-enclave public keys,
the one or more non-enclave participant computers produce the unencrypted random bits by decrypting the one or more encrypted random bits using the private protocol instance key, and
the one or more non-enclave participant computers each generate the output random bit by calculating the function of at least the unencrypted random bits.

15. A participant computer comprising:
a processor; and
a non-transitory computer readable medium coupled to the processor, the non-transitory computer readable medium comprising code, executable by the processor for implementing operations comprising:
broadcasting, by the participant computer in a network of participant computers, a public protocol instance key to one or more other participant computers, wherein the one or more other participant computers generate one or more encrypted random bits, the one or more encrypted random bits comprising random bits encrypted with the public protocol instance key;
receiving, by the participant computer, the one or more encrypted random bits from the one or more other participant computers;
producing, by the participant computer, one or more unencrypted random bits by decrypting the one or more encrypted random bits using a private protocol instance key; and
generating, by the participant computer, an output random bit by using a function and at least the one or more unencrypted random bits, and wherein the operations further comprise:
before broadcasting, by the participant computer, to one or more other participant computers, the public protocol instance key:
generating, by the participant computer, within a secure environment, an enclave key pair comprising an enclave public key and an enclave private key, wherein the enclave private key is stored within the secure environment, and wherein one or more enclave participant computers in the network of participant computers generate one or more other enclave key pairs;
broadcasting, by the participant computer to the one or more enclave participant computers, the enclave public key;
receiving, by the participant computer, one or more other enclave public keys from the one or more enclave participant computers; and
generating, by the participant computer, within the secure environment, a protocol instance key pair comprising the public protocol instance key and the private protocol instance key, wherein the private protocol instance key is stored within the secure environment.

16. A method comprising:
receiving, by a participant computer, from a generator participant computer, a public protocol instance key;
generating, by the participant computer, a random bit;
producing an encrypted random bit by encrypting the random bit using the public protocol instance key;
broadcasting, by the participant computer, to one or more other participant computers, the encrypted random bit;
receiving, by the participant computer, from the one or more other participant computers, one or more other encrypted random bits;
receiving, by the participant computer, from one or more enclave participant computers, an encrypted private protocol instance key, wherein the encrypted private protocol instance key is encrypted using a public key corresponding to the participant computer;
producing, by the participant computer, a private protocol instance key by decrypting the encrypted private protocol instance key using a private key corresponding to the participant computer;
producing, by the participant computer, one or more other random bits by decrypting the one or more other encrypted random bits using the private protocol instance key; and
generating, by the participant computer, an output random bit by using a function and the random bit and the one or more other random bits, wherein prior to the participant computer receiving the public protocol key instance, the generator participant computer:
generates, within a secure environment, an enclave key pair comprising an enclave public key and an enclave private key, wherein the enclave private key is stored within a secure environment, and wherein the one or more enclave participant computers are in a network of participant computers, and generate one or more other enclave key pairs;

broadcasts to the one or more enclave participant computers, the enclave public key;

receives one or more other enclave public keys from the one or more enclave participant computers; and generates, within the secure environment, a protocol instance key pair comprising the public protocol instance key and the private protocol instance key, wherein the private protocol instance key is stored within the secure environment.

17. The method of claim 16, wherein the function comprises an exclusive-or function.

18. The method of claim 16, wherein the participant computer receives a signed quote comprising the public protocol instance key and a hash measurement of an enclave program from the generator participant computer, and wherein the method further comprises:

verifying, by the participant computer that the signed quote is legitimate based on a digital signature and the hash measurement of the enclave program.

19. The method of claim 18, wherein if the signed quote is not legitimate, the method further comprises:

generating, by the participant computer, an alternative output random bit; and transmitting, by the participant computer, the alternative output random bit to one or more non-enclave participant computers.

* * * * *